US011370178B1

(12) United States Patent
Benes

(10) Patent No.: US 11,370,178 B1
(45) Date of Patent: Jun. 28, 2022

(54) SEAL PLATE ASSEMBLY

(71) Applicant: Davd J. Benes, Elkhorn, NE (US)

(72) Inventor: Davd J. Benes, Elkhorn, NE (US)

( * ) Notice: Subject to any disclaimer, the term of this patent is extended or adjusted under 35 U.S.C. 154(b) by 0 days.

(21) Appl. No.: 17/357,171

(22) Filed: Jun. 24, 2021

(51) Int. Cl.
*B29C 65/30* (2006.01)
*B29C 65/00* (2006.01)

(52) U.S. Cl.
CPC .......... *B29C 65/30* (2013.01); *B29C 66/8182* (2013.01); *B29C 66/81261* (2013.01); *B29C 66/8511* (2013.01)

(58) Field of Classification Search
CPC . B29C 65/30; B29C 66/8511; B29C 66/8182; B29C 66/81261
See application file for complete search history.

(56) References Cited

U.S. PATENT DOCUMENTS 3,303,628 A * 2/1967 Lovas ..................... B29C 66/21
 53/511
6,450,088 B1 * 9/2002 Hutchinson ....... B29C 66/43121
 219/544

* cited by examiner

*Primary Examiner* — Daniel McNally
(74) *Attorney, Agent, or Firm* — Suiter Swantz pc llo

(57) ABSTRACT

The seal plate assembly of this invention includes a base plate, an insulator pad positioned on the base plate, an electric heater pad positioned on the insulator pad and a pair of seal plates positioned on the electric heater pad, all of which have registering vacuum openings formed therein. The base plate, insulator pad, heater pad and seal plates are bolted together. The seal plates have spaced-apart cavities formed therein. A support plate is positioned in each of the cavities with each of the support plates having a length and width which is less than the length and width of the respective cavity to create a vacuum space at the perimeter of the support plates. The support plates are spaced above the bottom of the cavities.

7 Claims, 5 Drawing Sheets

SEAL PLATE ASSEMBLY

BACKGROUND OF THE INVENTION

Field of the Invention

This invention relates to a seal plate assembly for use with a plastic bag sealing apparatus. More particularly, this invention relates to a rodless seal plate assembly which is designed to be a replacement for the seal plate assemblies of the prior art plastic bag sealing apparatuses. Even more particularly, this invention relates to seal plate assembly which is easily mounted on an existing plastic bag sealing apparatus to replace the seal plate assembly thereon. Even more particularly, this invention relates to a seal plate assembly which has a longer life than prior art seal plate assemblies.

Description of the Related Art

Plastic bags are usually sealed by heating the perimeter of the bag. Normally, heat is applied to the perimeter of the bag, under vacuum pressure, to melt the plastic to weld the same together to close and seal the bag. In the prior art plastic bag sealing apparatuses, the heat to seal the perimeter of the bag is provided by a thick base heating unit having heating rods positioned therein. Much heat is lost in the thick base. Further, each of the heating rods have electrical wires connected thereto which extend to a source of electrical energy which results in many electrical wires or leads extending therefrom. If the prior art base heating element must be removed from the bag sealing apparatus for repair or replacement, much time is involved resulting in considerable downtime and monetary expense.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A seal plate assembly is disclosed which is designed to be used with a plastic bag sealing apparatus with the plastic bag sealing apparatus including a source of vacuum for drawing the plastic bag downwardly onto a heated seal plate. The seal plate assembly of this invention includes a horizontally disposed metal base plate, having an upper side and a lower side, with the metal base plate having a plurality of spaced-apart vacuum openings formed therein which extend from the lower side of the metal base plate to the upper side of the metal base plate. A horizontally disposed insulator pad, having an upper side and a lower side, is positioned on the upper side of the metal base plate with the insulator pad having a plurality of spaced-apart vacuum openings formed therein which register with the plurality of spaced-apart vacuum openings in the metal base plate.

A horizontally disposed electric heater pad, having an upper side and a lower side, is positioned on the upper side of the insulator pad. The electric heater pad has a plurality of spaced-apart vacuum openings formed therein which register with the plurality of vacuum openings in the insulator pad.

A horizontally disposed first seal plate member, having upper and lower sides, is positioned on a portion of the upper side of the electric heater pad and a horizontally disposed second seal plate member, having upper and lower sides, is positioned on a portion of the upper side of the electric heater pad adjacent to the first seal plate member. The first and second seal plate members are identical. Each of the first and second seal plate members have a plurality of spaced-apart cavities which extend downwardly into the respective seal plate member from the upper side thereof. Each of the cavities have a bottom. Each of the bottoms of the plurality of cavities have a plurality of spaced-apart vacuum openings formed therein which register with the vacuum openings in the electric heater pad. The base plate is secured to the first and second seal plate members with the insulator pad and electric heater pad being held in place therebetween.

In the preferred embodiment, the base plate and the first and second seal members are secured together by bolts. In the preferred embodiment, a support plate assembly is positioned in each of the cavities in the first and second seal plate members. Each of the support plate assemblies includes a horizontally disposed support plate which is spaced above the bottom of the respective cavity. Each of the support plates have a length and width which is less than the length and width of the respective cavity to create a vacuum space between the support plate and the cavity.

It is therefore a principal object of the invention to provide an improved seal plate assembly for use with a plastic bag sealing apparatus.

A further object of the invention is to provide a seal plate assembly which is designed to be a replacement for the seal plate assemblies of the prior art plastic bag sealing apparatuses.

A further object of the invention is to provide a seal plate assembly which is easily mounted on an existing plastic bag sealing apparatus to replace the seal plate assembly thereon.

A further object of the invention is to provide a seal plate assembly which reduces the number of electrical leads necessary for heating the seal plates.

A further object of the invention is to provide a seal plate assembly which is easily repaired or replaced.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
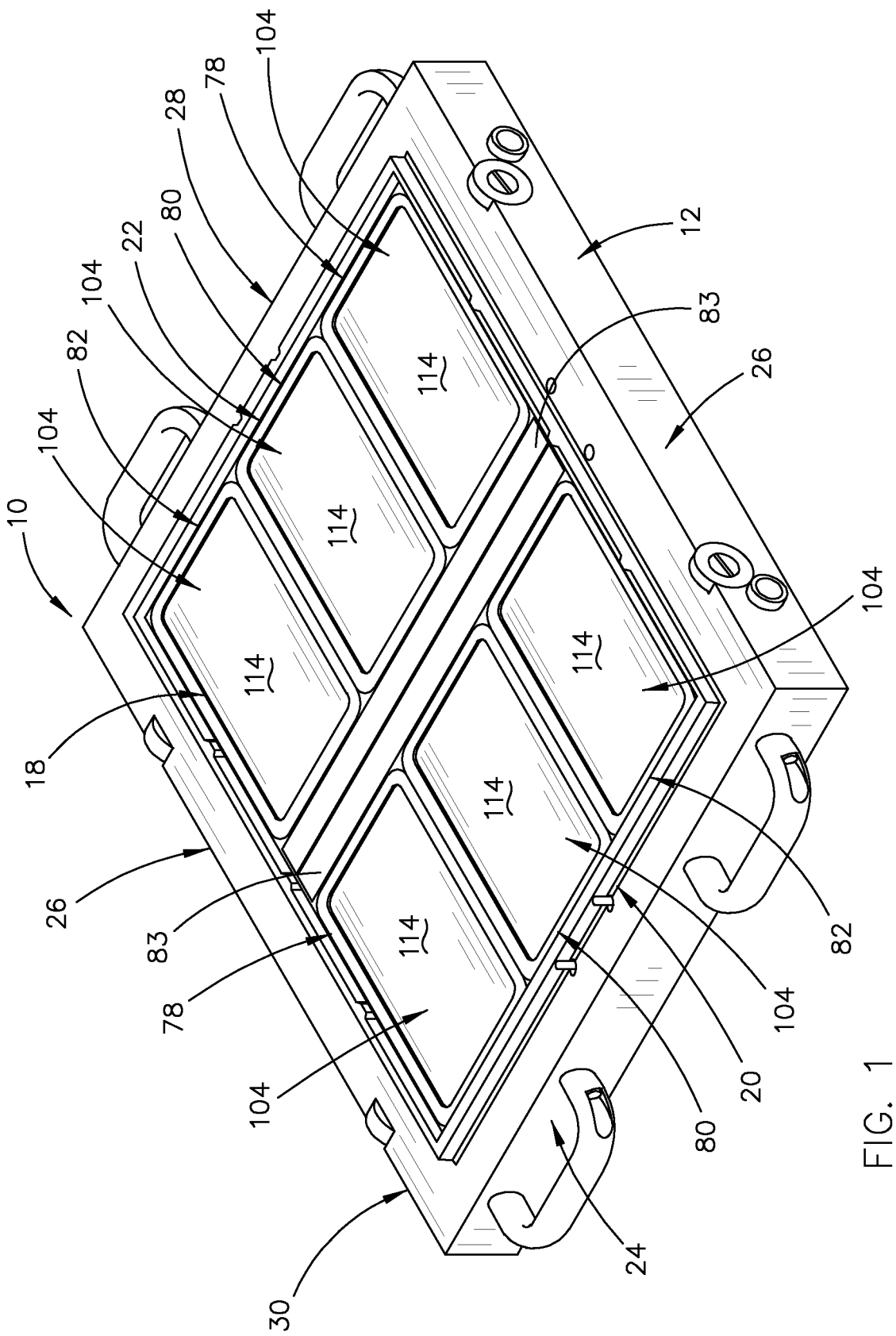
FIG. 1 is an upper perspective view of the seal plate assembly of this invention.
Figure 2:
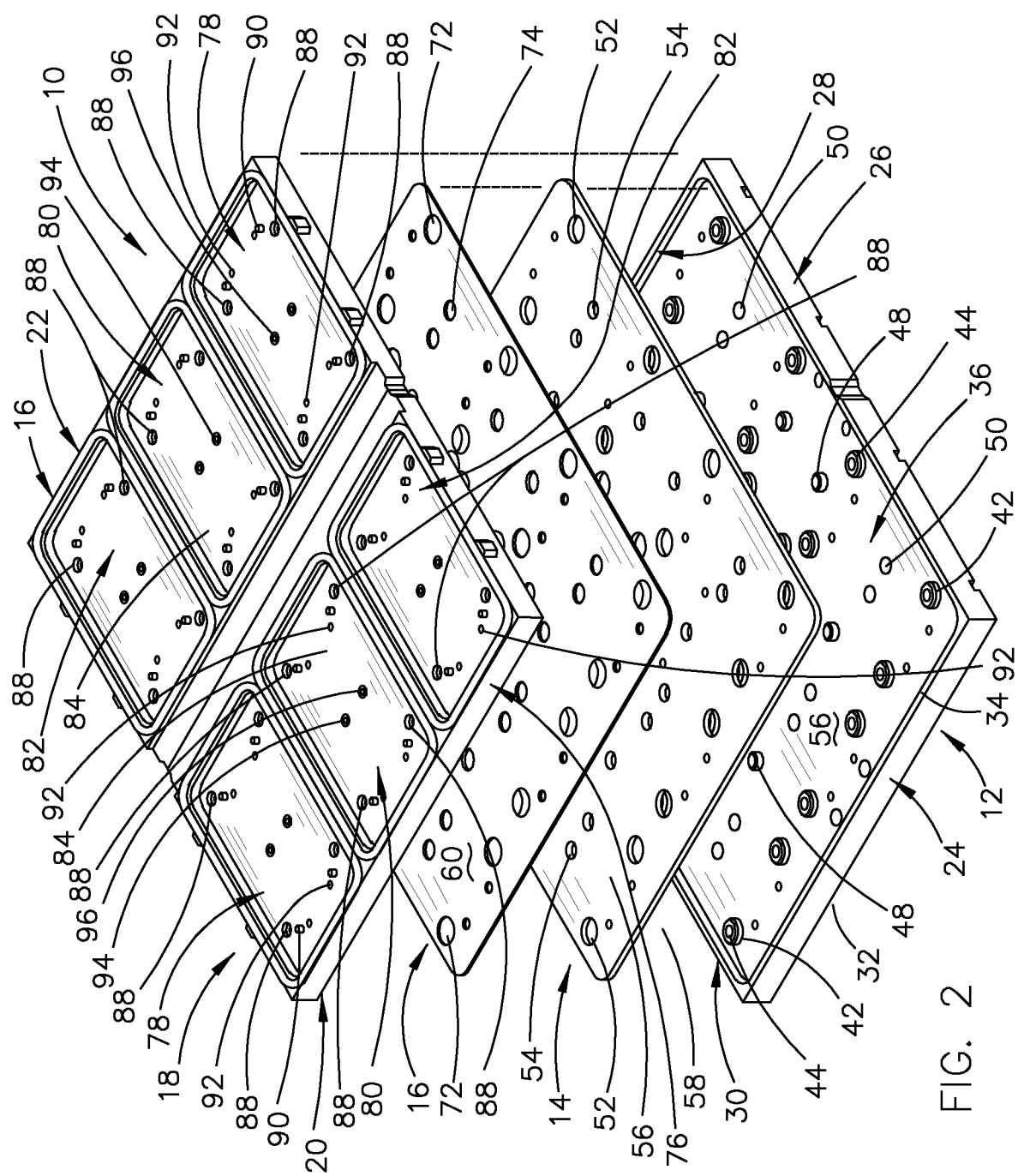
FIG. 2 is an exploded perspective view of the seal plate assembly of this invention.
Figure 3:
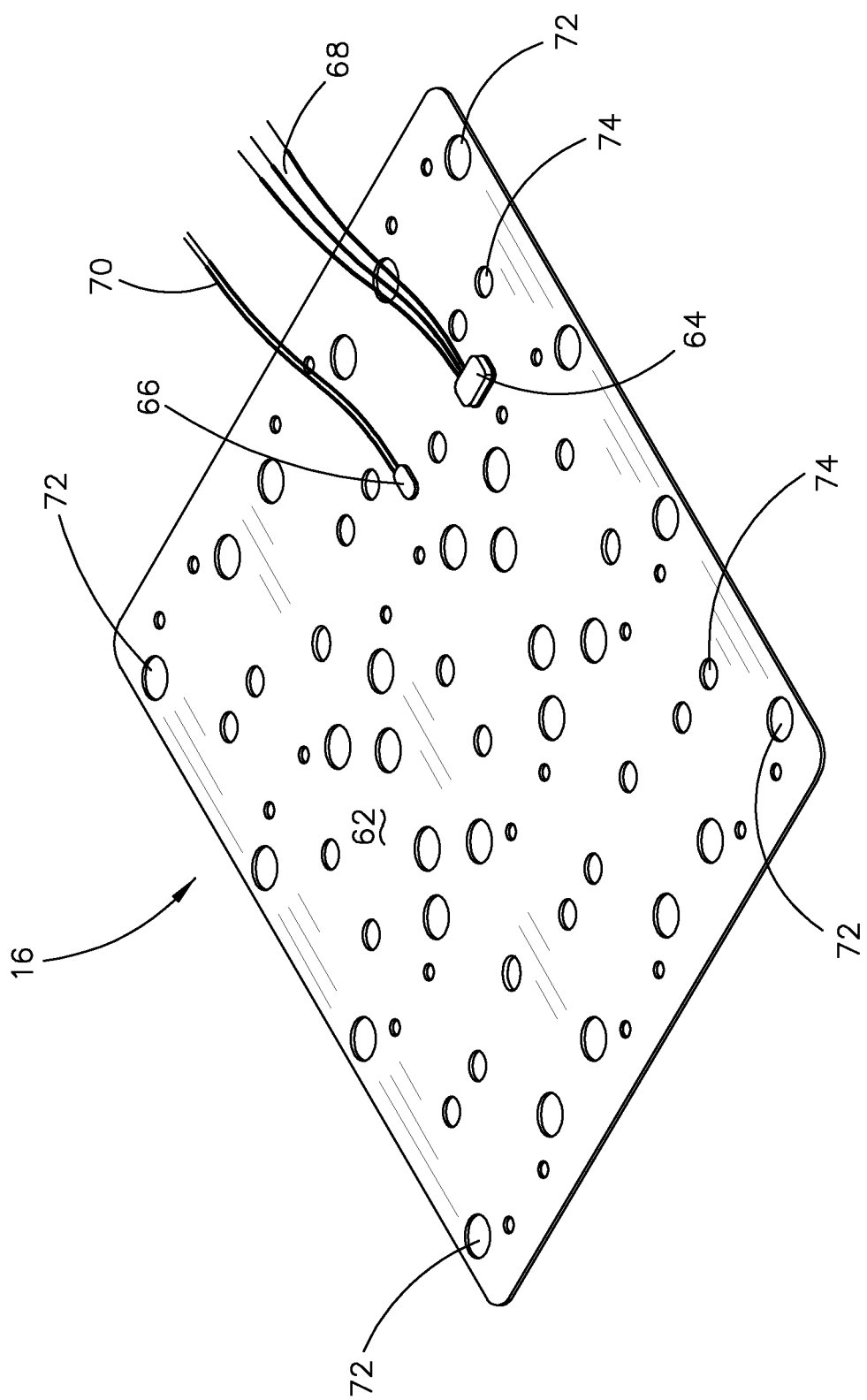
FIG. 3 is a perspective view of the underside of the heater pad of this invention.

The seal plate assembly of this invention is referred to by the reference numeral 10. Seal plate assembly 10 includes a base plate 12, an insulator pad 14, a heater pad 16 and a seal plate 18 comprised of identical seal plate members 20 and 22. Base plate 12 includes frame members 24, 26, 28 and 30 joined together as seen in FIG. 2. As seen, frame member 24 has a lower end 32 and an upper end 34. Frame members 26, 28 and 30 likewise have lower and upper ends. Base plate 12 has a body portion or bottom wall 36 which extends between frame members 24, 26, 28 and 30 below the upper ends thereof. Body portion 36 will be described as having an upper side 38 and a lower side 40. Base plate 12 is preferably comprised of aluminum.

Figure 5:
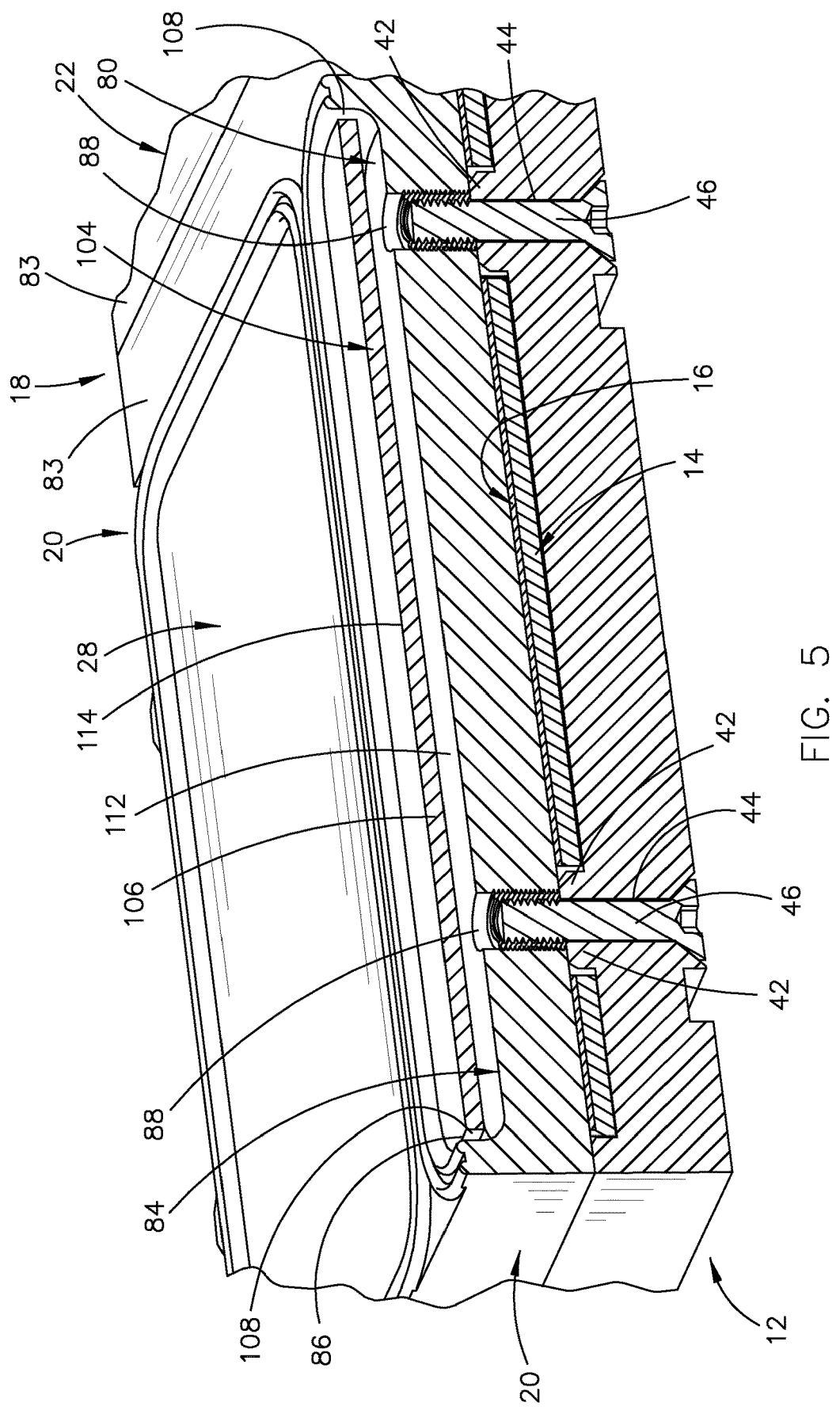
FIG. 5 is another partial sectional perspective view of the seal plate assembly of this invention.

Base plate 12 has 24 spaced-apart hollow sleeves 42 formed therewith which extend upwardly from the upper side 38 of body portion 36. Base plate 12 also has 24 bolt openings 44 formed therein which extend upwardly from the lower side 40 of base plate 12 and which extend through the sleeves 42. As seen in FIG. 5, the lower ends of bolt openings 44 are beveled. The bolt openings 44 and sleeves 42 are configured to receive bolts 46 therein as will be described hereinafter. Body portion 36 has a plurality of spaced-apart stand-offs 48 extending upwardly from the upper side 38 thereof. Body portion 36 also has a plurality of spaced-apart vacuum openings 50 formed therein which are in communication with a source of vacuum pressure provided by the bag sealing apparatus therebelow.

Insulator pad 14 has 24 openings 52 formed therein which register with the sleeves 42 of base plate 12 so as to receive the same therein when the components of the assembly 10 are secured together. Insulator pad 14 also has vacuum openings 54 formed therein which register with the vacuum openings 50 in base plate 12. Insulator pad 14 is preferably comprised of a foam rubber material. Insulator pad 14 will be described as having an upper side 56 and a lower side 58.

Heater pad 16 is flat and flexible and is preferably comprised of polyimide, silicone or mica material. Heater pad 16 will be described as having an upper side 60 and a lower side 62. The internal wiring of heater pad 16 is connected to a pair of connector or terminal plates 64 and 66 positioned at the lower side 62 of heater pad 16. A plurality of leads 68 extend from connector plate 64 and a plurality of leads 70 extend from connector plate 66. Leads 68 and 70 extend downwardly through openings in insulator pad 14 to a source of electrical energy. Heater pad 16 has a plurality of openings 72 formed therein which register with the openings 52 in insulator pad 14. Heater pad 16 also has a plurality of vacuum openings 74 formed therein which register with the vacuum openings 54 in insulator pad 14.

As stated above, seal plate 18 includes a pair of seal plate members 20 and 22. Inasmuch as the seal plate members 20 and 22 are identical, only seal plate member 20 will be described in detail with the same reference numerals being used in both seal plate members 20 and 22. Seal plate 20 includes a frame 76 having three cavities 78, 80 and 82 formed therein. For purposes of description, frame 76 will be described as having an inner end 83. Inasmuch as the cavities 78, 80 and 82 are identical, only cavity 80 will be described in detail. Cavity 80 includes a bottom 84 which is positioned below the upper end 86 of cavity 80. Four spaced-apart and internally threaded bolt openings 88 extend downwardly from bottom 84 of cavity 80 to the lower side of seal plate member 20. As seen, the lower ends of bolt openings 88 register with the openings 44 of base plate 12. Likewise, four spaced-apart and internally threaded bolt openings 88 extend downwardly from bottom 84 of cavity 78 and four spaced-apart and internally threaded bolt openings 88 extend downwardly from bottom 84 of cavity 82. The same is also true for the cavities 78, 80 and 82 of seal plate member 22. The insulator pad 14, heater pad 16 and seal plate 18 are secured to the base plate 12 by extending bolts 46 upwardly into openings 44 and threadably securing the bolts 46 to the internally threaded openings 88. The same is repeated for each of the cavities 78 and 82 of seal plate member 20 and the cavities 78, 80 and 82 of seal plate member 22. The tightening of the bolts 46 causes the seal plate 18 to be drawn downwardly which compresses the insulator pad 14.

Each of the cavities 78, 80 and 82 of seal plate members 20 and 22 have a plurality of spaced-apart stand-offs 90 which extend upwardly from the bottoms 84 thereof. Each of the bottoms 84 of the cavities 78, 80 and 82 of seal plate member 20 and cavities 78, 80 and 82 of seal plate member 22 have a plurality of spaced-apart vacuum openings 92 formed therein.

Figure 4:
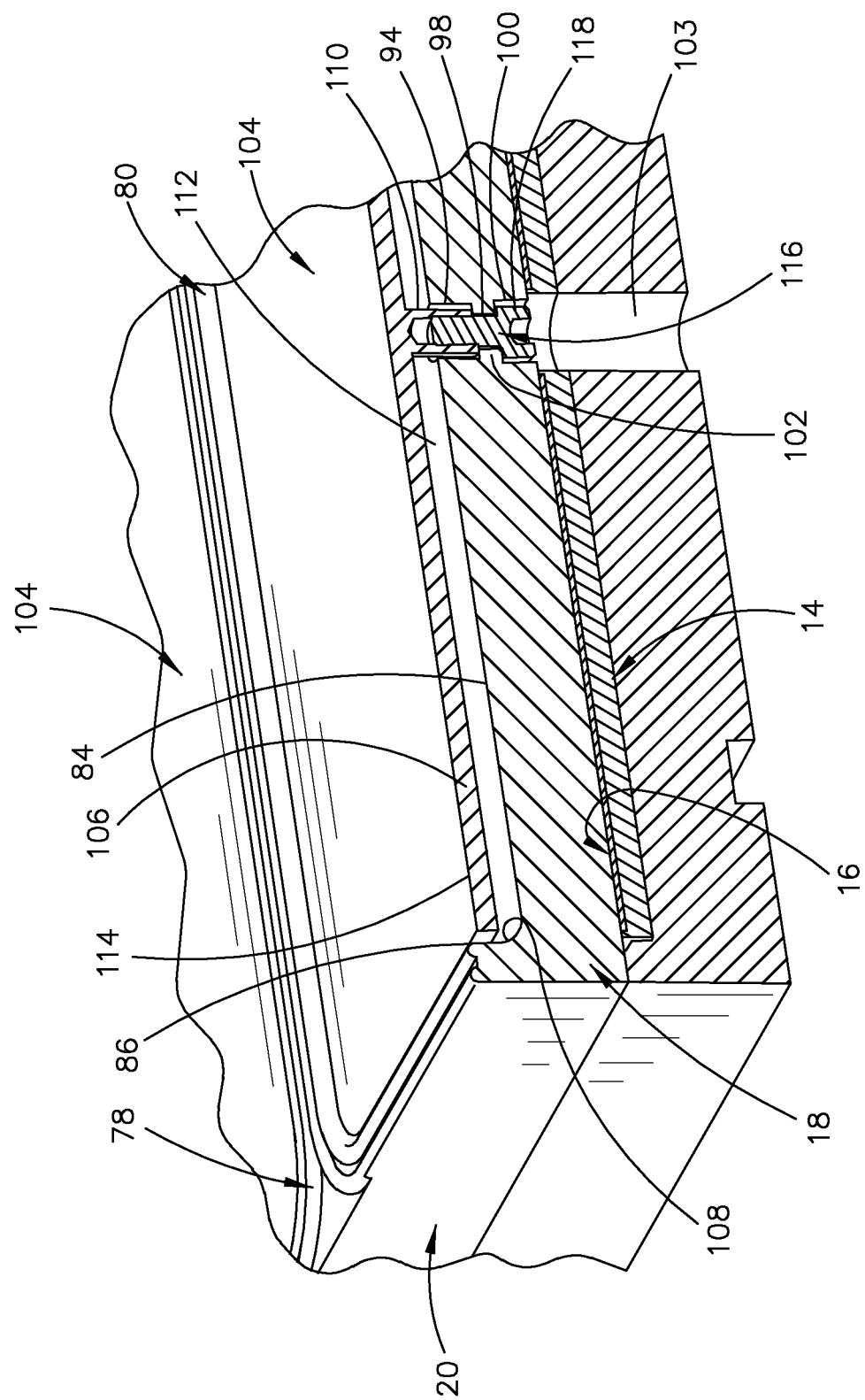
FIG. 4 is a partial sectional perspective view of the seal plate assembly of this invention.

Each of the cavities 78, 80 and 82 of seal plate member 20 and the cavities 78, 80 and 82 of seal plate member 22 have a pair of spaced-apart openings 94 and 96 formed therein which extend downwardly thereinto. A smaller opening 98 is formed at the lower end of each of the openings 94 and 96 and an opening 100 is formed in seal plate member 20 thereby creating an annular shoulder 102 as seen in FIG. 4.

The numeral 104 refers to a support plate assembly which is positioned in each of the cavities 78, 80 and 82 of seal plate members 20 and 22. Each of the support plate assemblies 104 includes a horizontally disposed metal plate 106 which has a length and width slightly less than the length and width of the associated cavity so that a space 108 is created between the outer ends of the plate 106 and the sides of the cavity. Each of the metal plates 106 has a pair of stand-off internally threaded tubes 110 which extend downwardly from the underside of the plates. When the tubes 110 are inserted downwardly into the openings 94 and 96, the lower ends of the tubes 110 engage the shoulder 102 to limit the downward movement of the plates 106 so that a vacuum space 112 is provided between the underside of the plates 106 and the bottoms 84 of the cavities. A pad 114 is positioned on the upper side of the plates 106. The support assemblies 104 are held in place by bolts 116 extending upwardly through opening 103 in base plate 12, through insulator pad 14, through heater pad 16 and into the seal plate 18. The upper ends of bolts 116 are threadably secured to the tubes 110 with the heads 118 of the bolts 116 engaging the shoulder 102 as seen in the drawings.

Thus, when assembled, the seal plate members 20 and 22 are secured to the base plate 12 by the plurality of bolts 46 with the insulator pad 14 and electric heater pad 16 being positioned therebetween. When the seal plate assembly 10 is placed into communication with a plastic bag sealing apparatus, the plastic bag sealing apparatus will cause a suction to be applied to the vacuum openings 50 in body portion 36 of base plate 12, to the vacuum openings 54 of insulator pad 14, to the vacuum openings 74 in heater pad 16 and the vacuum openings 92 in the bottom 84 of the cavities 78, 80 and 82 of the seal plate members 20 and 22. Suction will also be applied to the perimeter of the support plates 106 which causes the plastic bags positioned on the seal plate members 20 and 22 to be drawn downwardly onto the seal plate members 20 and 22. The heat from the heater pad 16 will heat the upper ends of the cavities to melt the perimeter of the plastic bags thereon to seal the plastic bags.

The seal plate assembly 10 is modular and is easily repaired or replaced. The heat from the heater pad 16 is insulated from the base plate 12 by the insulator pad 14.

Thus, a very efficient seal plate assembly has been provided which accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A seal plate assembly for use with a plastic bag sealing apparatus, comprising:
   a horizontally disposed metal base plate having an upper side and a lower side;
   said metal base plate having a plurality of spaced-apart vacuum openings formed therein which extend from said lower side of said metal base plate to said upper side of said metal base plate;
   a horizontally disposed insulator pad having an upper side and a lower side;
   said insulator pad being positioned on said upper side of said metal base plate;
   said insulator pad having a plurality of spaced-apart vacuum openings formed therein which register with said plurality of spaced-apart vacuum openings in said metal base plate;
   a horizontally disposed electric heater pad having an upper side and a lower side;
   said electric heater pad being positioned on said upper side of said insulator pad;
   said electric heater pad having a plurality of spaced-apart vacuum openings formed therein which register with said plurality of vacuum openings in said insulator pad;
   a horizontally disposed first seal plate member, having upper and lower sides, positioned on a portion of said upper side of electric heater pad;
   a horizontally disposed second seal plate member, having upper and lower sides, positioned on a portion of said upper side of said electric heater pad adjacent to said first seal plate member;
   said first and second seal plate members being identical;
   each of said first and second seal plate members having a plurality of spaced-apart cavities which extend downwardly into the respective seal plate member from said upper side thereof;
   each of said cavities having a bottom;
   each of said bottoms of said plurality of cavities having a plurality of spaced-apart vacuum openings formed therein which register with said vacuum openings in said electric heater pad; and
   said base plate being secured to said first and second seal plate members with said insulator pad and electric heater pad being held in place therebetween.

2. The seal plate assembly of claim 1 wherein a support plate assembly is positioned in each of said cavities in said first and second seal plate members.

3. The seal plate assembly of claim 2 wherein each of said support plate assemblies include a horizontally disposed support plate which is spaced above said bottom of the respective cavity.

4. The seal plate assembly of claim 3 wherein each of said support plates have a length and width which is less than the length and width of the respective cavity to create a vacuum space between said support plate and said cavity.

5. The seal plate assembly of claim 1 wherein said base plate and said first and second seal plate members are secured together by bolts.

6. A seal plate assembly for use with a plastic bag sealing apparatus, comprising:
   a horizontally disposed metal base plate including:
   (a) an elongated first frame member having a first end, a second end, a lower end, an upper end, an inner side and an outer side;
   (b) an elongated second frame member having a first end, a second end, a lower end, an upper end, an inner side and an outer side;
   (c) said first end of said second frame portion being joined to said second end of said first frame so as to extend transversely therefrom;
   (d) an elongated third frame member having a first end, a second end, a lower end, an upper end, an inner side and an outer side;
   (e) said first end of said third frame member being joined to said second end of said second frame member so as to extend transversely therefrom;
   (f) said first and third frame members being parallel to one another;
   (g) an elongated fourth frame member having a first end, a second end, a lower end, an upper end, an inner side and an outer side;
   (h) said first end of said fourth frame member being joined to said second end of said third frame member so as to extend transversely therefrom;
   (i) said second end of said fourth frame member being joined to said first end of said first frame member;
   (j) said second and fourth frame members being parallel to one another;
   (k) a horizontally disposed body portion, having upper and lower sides, extending between said inner sides of said first, second, third and fourth frame members below said upper ends of said first, second, third and fourth frame members;
   (l) said body portion having a plurality of spaced-apart vacuum openings formed therein which extend between said upper and lower sides of said body portion;
   (m) said body portion having a plurality of spaced-apart stand-offs extending upwardly from said upper side of said body portion;
   (n) said body portion having a plurality of spaced-apart sleeves extending upwardly from said upper side of said body portion with said sleeves having a central opening formed therein;
   (o) said body portion having a plurality of spaced-apart first bolt openings formed therein which extend upwardly into said lower side of said body portion and which communicate with said central openings of said sleeves; and
   (p) said body portion having a plurality of spaced-apart second bolt openings formed therein which extend upwardly into said lower side of said body portion;

an insulator pad, having an upper side and a lower side, positioned on said upper side of said body portion of said base plate;
said insulator pad having a plurality of spaced-apart openings formed therein which receive said sleeves of said body portion of said base plate;
said insulator pad having a plurality of spaced-apart vacuum openings formed therein which register with said vacuum openings in said body portion of said base plate;
said insulator pad having a plurality of spaced-apart openings formed therein which communicate with said first bolt openings in said base plate;
said insulator pad having a plurality of spaced-apart openings formed therein which communicate with said second bolt openings in said base plate;
an electric heater pad, having an upper side and a lower side, positioned on said upper side of said insulator pad;
said heater pad having a plurality of spaced-apart openings formed therein which register with said plurality of spaced-apart openings formed in said insulator pad which receive said sleeves therein;
said heater pad having a plurality of spaced-apart vacuum openings formed therein which register with said vacuum openings in said insulator pad;
said heater pad having a plurality of spaced-apart openings formed therein which register with said plurality of spaced-apart openings in said insulator pad which communicate with said first bolt openings in said base plate;
said heater pad having a plurality of spaced-apart openings formed therein which register with said plurality of spaced-apart openings formed in said insulator pad which communicate with said second bolt openings;
a horizontally disposed first seal plate member positioned on said upper side of said heating pad;
a horizontally disposed second seal plate member positioned on said upper side of said heating pad adjacent to said first seal plate member;
said first and second seal plate members being identical;
said first seal plate member comprising:
  (a) a first end, a second end, a third end and a fourth end;
  (b) a lower side;
  (c) an upper side;
  (d) a plurality of spaced-apart cavities extending downwardly into said upper side thereof;
  (e) each of said cavities having a bottom wall and an upper end which extends around said bottom wall above said bottom wall;
  (f) said bottom wall having a plurality of spaced-apart vacuum openings formed therein which register with said plurality of spaced-apart vacuum openings formed in said heater pad;
  (g) said bottom wall having a plurality of internally threaded bolt openings formed therein which register with said plurality of bolt openings formed in said base plate and said central openings in said sleeves;
  (h) a plurality of bolts extending upwardly through said plurality of bolt openings in said base plate, through said central openings in said sleeves, and into said plurality of internally threaded openings in said bottom wall of the associated cavity to secure said seal plate to said base plate;
  (i) a pair of spaced-apart openings, having upper and lower ends, extending downwardly into said bottom of each of said cavities;
  (j) a pair of spaced-apart openings, having upper and lower ends, extending upwardly into said lower end of said seal plate member below said pair of spaced-apart openings which extend downwardly into said bottom of each of said cavities;
  (k) a protruding annular shoulder positioned between said lower ends of said pair of spaced-apart openings, which extend downwardly into said bottom of each of said cavities and said upper ends of said pair of spaced-apart openings which extend upwardly into said lower end of said seal plate member;
said second seal plate member comprising:
  (a) a first end, a second end, a third end and a fourth end;
  (b) a lower side;
  (c) an upper side;
  (d) a plurality of spaced-apart cavities extending downwardly into said upper side thereof;
  (e) each of said cavities having a bottom wall and an upper end which extends around said bottom wall above said bottom wall;
  (f) said bottom wall having a plurality of spaced-apart vacuum openings formed therein which register with said plurality of spaced-apart vacuum openings formed in said heater pad;
  (g) said bottom wall having a plurality of internally threaded bolt openings formed therein which register with said plurality of bolt openings formed in said base plate and said central openings in said sleeves;
  (h) a plurality of bolts extending upwardly through said plurality of bolt openings in said base plate, through said central openings in said sleeves, and into said plurality of internally threaded openings in said bottom wall of the associated cavity to secure said seal plate to said base plate;
  (i) a pair of spaced-apart openings, having upper and lower ends, extending downwardly into said bottom of each of said cavities;
  (j) a pair of spaced-apart openings, having upper and lower ends, extending upwardly into said lower end of said seal plate member below said pair of spaced-apart openings which extend downwardly into said bottom of each of said cavities; and
  (k) a protruding annular shoulder positioned between said lower ends of said pair of spaced-apart openings, which extend downwardly into said bottom of each of said cavities and said upper ends of said pair of spaced-apart openings which extend upwardly into said lower end of said seal plate member;
a support plate assembly positioned in each of said cavities of said first and second seal plate members;
each of said support assemblies including:
  (a) a horizontally disposed flat support plate having an upper side, a lower side, a first end, a second end, a first side and a second side;
  (b) a pair of spaced-apart and internally threaded tubes, having upper and lower ends, extending downwardly into said pair of spaced-apart openings which extend downwardly into said bottom of the cavity so that said lower ends of said pair of spaced-apart and internally threaded tubes engage said protruding annular shoulders so that said lower side of the support plate is positioned above the bottom of the cavity;
  (c) each of said support plates having a length and width which is less than the length and width of the respective cavity so that a vacuum space is provided at the ends and sides of the support plate; and (d) bolts extending upwardly into said pair of openings which extend upwardly into said lower side of said base plate for threadable engagement with said pair of internally threaded tubes to maintain the respective support plate in position in the respective cavity.

7. A seal plate assembly for use with a plastic bag sealing apparatus, comprising:

a horizontally disposed metal base plate including:

(a) an elongated first frame member having a first end, a second end, a lower end, an upper end, an inner side and an outer side;

(b) an elongated second frame member having a first end, a second end, a lower end, an upper end, an inner side and an outer side;

(c) said first end of said second frame portion being joined to said second end of said first frame so as to extend transversely therefrom;

(d) an elongated third frame member having a first end, a second end, a lower end, an upper end, an inner side and an outer side;

(e) said first end of said third frame member being joined to said second end of said second frame member so as to extend transversely therefrom;

(f) said first and third frame members being parallel to one another;

(g) an elongated fourth frame member having a first end, a second end, a lower end, an upper end, an inner side and an outer side;

(h) said first end of said fourth frame member being joined to said second end of said third frame member so as to extend transversely therefrom;

(i) said second end of said fourth frame member being joined to said first end of said first frame member;

(j) said second and fourth frame members being parallel to one another;

(k) a horizontally disposed body portion, having upper and lower sides, extending between said inner sides of said first, second, third and fourth frame members below said upper ends of said first, second, third and fourth frame members;

(l) said body portion having a plurality of spaced-apart vacuum openings formed therein which extend between said upper and lower sides of said body portion;

(m) said body portion having a plurality of spaced-apart sleeves extending upwardly from said upper side of said body portion with said sleeves having a central opening formed therein;

an insulator pad, having an upper side and a lower side, positioned on said upper side of said body portion of said base plate;

said insulator pad having a plurality of spaced-apart openings formed therein which receive said sleeves of said body portion of said base plate;

said insulator pad having a plurality of spaced-apart vacuum openings formed therein which register with said vacuum openings in said body portion of said base plate;

an electric heater pad, having an upper side and a lower side, positioned on said upper side of said insulator pad;

said heater pad having a plurality of spaced-apart openings formed therein which register with said plurality of spaced-apart openings formed in said insulator pad which receive said sleeves therein;

said heater pad having a plurality of spaced-apart vacuum openings formed therein which register with said vacuum openings in said insulator pad;

a horizontally disposed first seal plate member positioned on said upper side of said heating pad;

a horizontally disposed second seal plate member positioned on said upper side of said heating pad adjacent to said first seal plate member;

said first and second seal plate members being identical;

said first seal plate member comprising:

(a) a first end, a second end, a third end and a fourth end;

(b) a lower side;

(c) an upper side;

(d) a plurality of spaced-apart cavities extending downwardly into said upper side thereof;

(e) each of said cavities having a bottom wall and an upper end which extends around said bottom wall above said bottom wall;

(f) said bottom wall having a plurality of spaced-apart vacuum openings formed therein which register with said plurality of spaced-apart vacuum openings formed in said heater pad;

said second seal plate member comprising:

(a) a first end, a second end, a third end and a fourth end;

(b) a lower side;

(c) an upper side;

(d) a plurality of spaced-apart cavities extending downwardly into said upper side thereof;

(e) each of said cavities having a bottom wall and an upper end which extends around said bottom wall above said bottom wall;

(f) said bottom wall having a plurality of spaced-apart vacuum openings formed therein which register with said plurality of spaced-apart vacuum openings formed in said heater pad;

a support plate assembly positioned in each of said cavities of said first and second seal plate members;

each of said support assemblies including:

(a) a horizontally disposed flat support plate having an upper side, a lower side, a first end, a second end, a first side and a second side;

(b) each of said support plates having a length and width which is less than the length and width of the respective cavity so that a vacuum space is provided at the ends and sides of the support plate; and (c) said support plates being positioned above said bottom of said respective cavity.

* * * * *